United States Patent [19]
Molina

[11] 3,777,157
[45] Dec. 4, 1973

[54] WATER WASHABLE DYE PENETRANT COMPOSITION AND METHOD OF APPLICATION

[75] Inventor: Orlando G. Molina, Westminster, Calif.

[73] Assignee: North American Rockwell Corporation, El Segundo, Calif.

[22] Filed: Jan. 24, 1973

[21] Appl. No.: 326,359

[52] U.S. Cl. .......................... 250/302, 252/301.2 W
[51] Int. Cl. ............................................. G01n 21/16
[58] Field of Search .................................... 250/302; 252/301.2 W

[56] References Cited
UNITED STATES PATENTS

| | | | |
|---|---|---|---|
| 3,543,570 | 12/1970 | Mlot-Fijalkowski | 250/302 X |
| 3,567,932 | 3/1971 | Alburger | 250/302 |
| 3,679,598 | 7/1972 | Alburger | 250/302 X |

*Primary Examiner*—Archie R. Borchelt
*Attorney*—L. Lee Humphries et al.

[57] ABSTRACT

A water washable dye penetrant composition for use in non-destructive testing of objects to locate voids and defects therein, containing an organic dye, preferably a fluorescent dye, a solvent for said dye, particularly an N-alkyl-2-pyrrolidone, e.g. N-methyl-2-pyrrolidone, and glycol monobutyl ether for thinning the dye penetrant solution substantially without changing any of its original functional characteristics, and particularly without affecting the sensitivity of the penetrant. In the method of application of the dye penetrant composition, such composition is applied to the surface of an object containing cracks and flaws, water is applied to the surface of the object, preferentially removing the glycol monobutyl ether vehicle or carrier, and momentarily leaving the remaining dye penetrant uniformly distributed on the surface, which is finally washed off the part, both the removal of the glycol ether component and the remaining dye penetrant occurring in the same washing operation. The part is then inspected under appropriate lighting conditions such as fluorescent or black light, to obtain colored traces from the dye penetrant remaining in the cracks and flaws.

26 Claims, No Drawings

WATER WASHABLE DYE PENETRANT COMPOSITION AND METHOD OF APPLICATION

BACKGROUND OF THE INVENTION

This invention relates to an improved dye penetrant composition and method for non-destructively testing metal specimens to locate and identify surface voids or defects, and is more particularly concerned with the provision of an improved water washable dye penetrant composition or solution containing a specific relatively non-volatile solvent for thinning such water washable dye penetrant, said solvent being preferentially removable upon application of water to an object to which the dye penetrant composition has been applied, the remaining dye penetrant composition having substantially the same properties as the initial composition in the absence of such solvent, including substantially the same sensitivity, and with the method of employing such water washable dye penetrant composition in a penetrant inspection process.

In known penetrant inspection methods for rapid location and evaluation of surface flaws or cracks in test bodies or parts, a dye penetrant composition, preferably containing a fluorescent dye, and which will penetrate the openings of the surface cracks or flaws in the part, is applied to the surface of the test body, and the excess penetrant composition is removed from the surface of the body. A developer composition may then be applied to the part surface, which acts as a wick and causes the liquid penetrant containing the fluorescent dye, which was retained in the cracks or surface flaws, to be drawn up out of the surface defects by capillary action. The part is then exposed to appropriate lighting conditions, such as invisible fluorescigenous light, and the location of the surface flaws is revealed by the emission of visible fluorescent light by the penetrant dye which was retained in the cracks or flaws after the penetrant composition was removed from the surface of the part.

For best efficiency, particularly for the detection and location of minute surface cracks and flaws, it is necessary that the dye penetrant composition have high sensitivity.

Volatile type solvents are commonly employed for extending or thinning dye penetrant inspection solutions or compositions. This is done chiefly for the purpose of lowering the viscosity of the penetrant in order to adapt it for application in spraying systems. Thus for example solvents such as kerosene, light fuel oils, and methyl ethyl ketone, all highly volatile solvents, have heretofore been employed in prior art dye penetrants. See for example U.S. Pat. No. 2,806,959.

Another reason for thinning a penetrant solution is the resulting economy due to the extending effect which the solvent has in the penetrant solution. However, for this purpose, the solvent must evaporate quickly after its application to a part surface, otherwise the properties of the penetrant, such as fluorescence and sensitivity are greatly reduced by the presence of a solvent which does not evaporate. Therefore, the use of volatile solvents has heretofore generally been considered necessary for this purpose.

However, the use of volatile solvents in dye penetrant compositions has certain disadvantages. Thus, the use of volatile solvents in dye penetrants results in the evolution of fumes and solvent vapors which are rapidly formed by the evaporating solvent.

Further, where volatile chlorinated solvents are employed, this is disadvantageous due to the noncompatibility or corrosive action of many of such volatile solvents on metals such as titanium and certain steel alloys.

The chief object of the present invention accordingly is the provision of a water washable dye penetrant solution or composition which avoids the use of volatile solvents and its above-noted disadvantages, yet which can be readily removed following application of the dye penetrant to a test body, substantially without affecting the properties of the dye penetrant solution, and particularly its brightness or fluorescence, and sensitivity. An additional object is the provision of procedure for effectively utilizing such improved water washable dye penetrant composition in a dye penetrant inspection operation.

DESCRIPTION OF THE INVENTION

The above objects and advantages are accomplished according to the invention by incorporating in a dye penetrant composition containing a dye, e.g. a fluorescent dye, and a pyrrolidone solvent for said dye, e.g. N-methyl-2-pyrrolidone, the relatively nonvolatile solvent glycol monobutyl ether (otherwise known as ethylene glycol monobutyl ether or 2-butoxy ethanol), and commonly known as butyl Cellosolve. Such glycol monobutyl ether solvent functions as a temporary carrier for the dye penetrant, and has the important property and advantage of diluting or thinning a water washable penetrant composition of the type noted above, particularly one containing a fluorescent dye, substantially without affecting or changing the brightness or fluorescence, and the sensitivity of the dye penetrant, following removal of such carrier, the term "sensitivity" referring to the ability of the penetrant to disclose defects which the penetrant discloses or detects in normal undiluted state, that is in the absence of the glycol ether component. Such glycol monobutyl ether can be added to the dye penetrant composition, e.g. in an amount up to about 60 percent by volume, for the above purpose. It has also been observed that the glycol monobutyl ether solvent hereof when employed in a dye penetrant, markedly improves the dye penetrant by increasing its washability from the part to which the dye penetrant is employed, without dislodging the entrapped dye penetrant composition from the surface defects and cracks in the part.

Thus, for detecting cracks and flaws in the surface of an object employing the dye penetrant composition of the invention containing the glycol monobutyl ether solvent, such dye penetrant solution is applied to the surface of the part, and a water wash is applied to the dye penetrant covering the surface, preferentially first removing the glycol monobutyl ether from the dye penetrant, followed substantially instantaneously by removing or washing away of the remaining liquid dye penetrant containing the dye and solvent vehicle such as N-methyl-2-pyrrolidone, uniformly distributed on the surface. It should be noted that this is an essentially single step water washing operation, and that the preferential removal of such glycol monobutyl ether together with subsequent immediate removal of such remaining liquid dye penetrant, both occur in such single washing operation.

It has been found that glycol monobutyl ether is the only relatively nonvolatile solvent which has the ability of immediately abandoning the penetrant solution upon contact with water. This is due to the property of such glycol ether of having preferential affinity for water, and thus being preferentially removed first with the water wash, while momentarily leaving the dye penetrant containing dye and dye vehicle e.g. N-methyl-2-pyrrolidone, uniformly distributed over the surface of the part, and which is then finally removed by the water wash. Such immediate and momentary disassociation and removal of the glycol monobutyl ether from the basic penetrant formulation upon application of water, thus permits the remaining dye penetrant to have the same sensitivity and brightness properties as the initially formulated penetrant composition, prior to incorporation of such glycol ether, with the advantages that the removal of such nonvolatile solvent is accomplished rapidly by means of a water wash, followed immediately by removal of the remaining dye penetrant uniformly distributed over the surface of the part, in the same water wash, without the necessity of using a volatile type solvent for this purpose. That the glycol monobutyl ether component is completely removed from the dye penetrant during such water wash is evident from the fact that there is an absence of blue fluorescence in the dye penetrant remaining in the cracks and flaws, which fluorescence would occur if such glycol ether component were present. When employing volatile type solvents for thinning dye penetrants, as in the prior art, it is necessary to wait for complete evaporation of the solvent and for the remaining penetrant to dry, before removal of remaining dye penetrant. If such volatile solvent-thinned penetrant is removed by the washing step before its solvent evaporates, the volatile solvent still present in the remaining penetrant in the cracks and flaws will affect the sensitivity of the dye penetrant.

It has been found fro testing and experience that glycol monobutyl ether is the only relatively nonvolatile solvent which will perform in the above manner, that is as an extender for the dye penetrant, and which is preferentially removable therefrom with a water wash, while obtaining the above-noted advantages. Thus, it has been found that mono- or dialkyl ethers of ethylene glycol other than the above-noted ethylene glycol monobutyl ether, are not suitable for employment in the dye penetrant composition hereof. For example, many of such other glycol ethers are hygroscopic and certain of these materials are also toxic, while some tend to be corrosive to metals and some have an undesirable degree of flammability. On the other hand, glycol monobutyl ether is substantially free of these undesirable characteristics.

The amount of the glycol monobutyl ether incorporated into the dye penetrant composition hereof can vary, but generally such glycol ether component is employed in a range of from about 10 to about 60 percent, preferably from about 20 to about 50 percent, by volume of the total dye penetrant composition.

It will be understood, in carrying out the invention process, if necessary, the part or surface to be inspected first can be suitably prepared as for example by suitably cleaning and drying the part.

The liquid dye penetrant composition containing the glycol monobutyl ether is applied to the test specimen, for example by dipping same into a bath of the penetrant, or the penetrant can be poured or sprayed onto the surface of the test specimen. Preferably the dye penetrant composition hereof is sprayed on the specimen surface, such spraying being aided by use of the glycol monobutyl ether extender. The dye penetrant composition is maintained on the surface of the test body or specimen for a period sufficient to permit the composition to penetrate the cracks and imperfections in the part surface, e.g. for about 1 to about 5 minutes.

The above-noted water wash is then applied for preferentially removing the glycol monobutyl ether from the dye penetrant, the excess remaining dye penetrant composition, stripped of the glycol monobutyl ether, then immediately being removed or washed off the surface of the part being tested, as noted above, in the same wash operation, without being removed from the openings of the surface cracks or flaws. This washing operation can be accomplished by any suitable means such as by application of a plain water spray or a sprayed mixture of air and water, leaving a portion of the dye penetrant free of glycol monobutyl ether remaining in the cracks and defects of the part. The part surface is then viewed under suitable lighting conditions, e.g. ultraviolet or black light when the dye in the dye penetrant is a fluorescent dye, to locate any cracks or defects on the surface of the body, as indicated by colored traces, for example, by fluorescent emissions, from the dye penetrant therein.

A developer composition may or may not be employed in conjunction with the dye penetrant composition of the invention. Where the surface of the part is relatively rough, and has relatively gross cracks therein for example above 20 microinches in width, it is generally not necessary to employ a developer. However, if the part has a smooth surface and it is desirable to detect minute cracks or microcracks therein, it is preferable to employ a developer composition. Where the liquid dye penetrant hereof is employed in conjunction with a developer, either in liquid or powder form, following washing to remove excess penetrant, the developer composition is applied to the part surface and, if desired, excess developer coating can be removed from the surface in a suitable manner, as by means of a gentle air blast. Thereafter, the part surface is inspected under suitable lighting conditions, e.g. ultraviolet light, to detect cracks and flaws in such surface.

The dye penetrant composition in which the glycol monobutyl ether nonvolatile solvent component can be incorporated to achieve the advantages of the invention in accordance with the invention process, is a liquid dye penetrant which contains a dye and a pyrrolidone solvent vehicle for the dye, as defined below. Preferably, however fluorescent dye penetrant compositions are employed, that is a dye penetrant containing a fluorescent dye. The pyrrolidone solvent vehicle for the dye is compatible with the dye and with the other components of the composition, including the glycol monobutyl ether component, and has the ability to dissolve a relatively large amount of dye per unit of volume and to hold a high concentration of dye in solution and provide good resolution and clarity of the dye trace in the cracks and flaws. The preferred dye solvent vehicle found particularly effective for use in conjunction with the glycol monobutyl ether nonvolatile extender solvent of the invention, are the N-alkyl-2-pyrrolidones disclosed in my copending application Ser. No. 220,414 filed Jan. 24, 1972. The alkyl group of such pyrrolidones contains from one to four carbon atoms, such as the methyl, ethyl, propyl, isopropyl butyl and isobutyl derivatives, the preferred pyrrolidone of this type being N-methyl-2-pyrrolidone.

The dye penetrant, e.g. fluorescent penetrant composition, in which the glycol monobutyl ether is incorporated, can be an oil base, surfactant base, or solvent base penetrant composition.

As previously noted, the dye penetrant solution employed according to the invention preferably contains a fluorescent dye. Various types of fluorescent dyes can be employed including for example the dye marketed as Fluorol 7GA as well as other fluorescent dyes such as those marketed as Calcofluor Yellow, Azosol Brilliant Yellow 6GF, Rhodanine B, Rhodenine 6 GDN, Calcofluor White RW, Blancophor White AW, Auramine and Eosine G, and water soluble fluorescent dyes such as Blancophor FFG.

The fluorescent penetrant composition according to my above copending application and particularly containing N-methyl-2-pyrrolidone as dye solvent, following removal of the glycol monobutyl ether solvent, permits immediate and rapid cleaning of the remaining dye penetrant from the specimen surface by the application of water thereto without the intermediate use of emulsifiers or the like. Also, if desired, and as described in my above copending application Ser. No. 220,414, a surfactant can be incorporated into the dye penetrant composition, which functions to more readily remove excess dye together with excess pyrrolidone dye solvent vehicle from the surface upon application of water. Such surfactant can be water soluble or water insoluble, or a combination thereof, and can be for example a nonionic detergent such as Tergitol Nonionic NPX of Union Carbide, a hydrophilic nonionic detergent containing ether-oxygen groups, and which is understood to be a nonyl phenyl polyethylene glycol ether containing 10.5 ethylene oxide groups. Further, the dye penetrant composition into which the glycol monobutyl ether component hereof can be incorporated can include a water insoluble surfactant such as Tergitol Nonionic NP-14, also a nonyl phenyl polyethylene glycol ether but containing only 4 ethylene oxide groups, and also solvents such as isobutyl heptyl ketone.

The amount of pyrrolidone solvent vehicle for the dye which can be used can vary considerably and can range from about 3 to about 85 percent by volume of the total penetrant including glycol monobutyl ether. The ratio of dye to pyrrolidone can range from about 1 part of dye to about 25 parts of pyrrolidone, to about 2 parts of dye to about 1 part of pyrrolidone, by volume.

The dye penetrant composition employed according to the invention in conjunction with the glycol monobutyl ether nonvolatile extender hereof, can contain non-fluorescent or daylight type dyes such as azo type dyes, e.g. xyleneazo-beta-naphthol, Mefford No. 322 dye, believed to be o-toluene-azoxyleneazo-beta-naphthol, and the azo dyes marketed as Oil Red "O" and Sudan Red. These dyes conveniently can be employed where deylight or white light is only available, and particularly where the surface of the body to be detected contains relatively gross cracks. However, it is preferred to employ fluorescent dyes having greater sensitivity or detectability as result of the high contrast obtained by the fluorescent indications.

In preparing the dye penetrant composition of the invention, the glycol monobutyl ether component can be incorporated into the basic composition containing dye, pyrrolidone dye solvent vehicle and other components such as surfactants, at any stage, e.g. such glycol ether component can be added after preparation of the basic dye penetrant.

Where a developer composition is employed, any one of the three general types of developer compositions, namely, dry powder, wet aqueous (water-base) and wet nonaqueous (volatile solvent base) developer compositions can be employed. In each case, the developer composition contains a light colored powder, forming a coating which contrasts with the color of the dye in the penetrant and which acts as a wick or blotter, and causes liquid penetrant containing the dye, e.g. fluorescent dye, which was retained in the cracks or surface flaws, to be drawn up out of the surface defects by capillary action and to "bleed" through the powder. Preferred developer compositions for use in conjunction with the dye penetrant composition according to the invention, are those described in my copending application Ser. No. 212,799, filed Dec. 27, 1971, which is a dry powder developer containing fumed alumina, fumed silica, fumed titanium dioxide and talc, and in my copending application Ser. No. 295,061, filed Oct. 4, 1972, now U.S. Pat. No. 3,748,469, and which is a wet nonaqueous developer composition consisting essentially of isopropyl alcohol, talc and glycol monobutyl ether. The descriptions of such developer compositions contained in the above copending applications are incorporated herein by reference.

The following examples serve to illustrate but are not limitative of the benefits and advantages obtained by practice of the present invention.

EXAMPLE 1

The following liquid dye penetrant was prepared and designated dye penetrant A':

| | Parts by Volume |
|---|---|
| N-methyl-2-pyrrolidone | 2½ |
| Isobutyl heptyl ketone | 7½ |
| Tergitol Nonionic NPX | 5 |
| Tergitol Nonionic NP-14 | 7½ |
| Calcofluor White RW | 2 |
| Fluorol 7 GA | 0.66 |

To the above dye penetrant A' was added glycol monobutyl ether in an amount of 40 percent by volume of the total resulting dye penetrant composition. Such dye penetrant composition containing glycol monobutyl ether is designated composition A.

The fluorescent dye penetrant composition A above was applied as by spraying, to one-half the surface of a chromium-plated brass test panel containing cracks 0.00002 to 0.0001 inch in width, closely distributed over its entire surface. A water wash was then applied by an air-water rinser over the coating of dye penetrant composition A on the test panel, causing preferential removal of the glycol monobutyl ether from the dye penetrant composition, and also instantaneously washing remaining dye penetrant, now free of glycol monobutyl ether, and corresponding to the initial dye penetrant A', from the surface of the test panel.

The other half of the test panel surface was sprayed with dye penetrant A' above, initially containing no glycol monobutyl ether. The excess dye penetrant was then removed by spraying a mixture of air and water over the panel surface.

Both halves of the test panel surface to which penetrant composition A and penetrant A' were initially respectively applied, were then covered with a powder developer having the following composition, according to my above copending application Ser. No. 212,799:

| Components | Percent by weight |
|---|---|
| Talc | 52 |
| Alumina | 35 |
| Silica | 4 |
| $TiO_2$ | 9 |

The above developer was permitted to dwell over the two half surfaces of the test panel for a period of 2 minutes.

Excess developer composition was then carefully removed from both half surfaces of the test panel by means of a gentle air blast.

The panel was then placed under black light (fluorescent) illumination and the respective half surfaces viewed in such illumination. It was observed that the first half side of the panel which had initially been treated with dye penetrant composition A containing glycol monobutyl ether, followed by removal of such glycol ether by water wash according to the present invention, disclosed fluorescent indications from numerous readily defined microcracks therein, and closely corresponding to the brightness and concentration of the fluorescent indications from the microcracks in the half side of the panel which had been initially treated with dye penetrant A' containing no glycol monobutyl ether.

From the above, it is seen that the glycol monobutyl ether, while serving as an extender and temporary carrier for the dye penetrant A', can be readily removed from the dye penetrant, so that the resulting dye penetrant has substantially the same fluorescent brightness and sensitivity characteristics as the dye penetrant A' initially applied, in the absence of the glycol monobutyl ether extender.

EXAMPLE 2

The following liquid dye penetrant, designated dye penetrant B' was prepared:

| | Parts by Volume |
|---|---|
| N-methyl-2-pyrrolidone | 2½ |
| Isobutyl heptyl ketone | 20 |
| Tergitol Nonionic NPX | 15 |
| Calcofluor White RW | 2 |
| Fluorol 7 GA | 0.66 |

To the above dye penetrant was added glycol monobutyl ether in an amount of 20 percent by volume of the total resulting dye penetrant composition. Such dye penetrant composition containing glycol monobutyl ether was designated composition B.

The fluorescent dye penetrant composition B above was applied as by spraying, to one-half the surface of an aluminum test panel containing microcracks of substantially the same size as the microcracks in the chromium-plated brass test panel of Example 1, closely distributed over its entire surface. A water wash was then applied, by spraying water over the coating of dye penetrant composition B on the test panel, causing in the same water wash operation, preferential removal of the glycol monobutyl ether from the dye penetrant composition, followed by immediate removal of remaining dye penetrant free of glycol monobutyl ether, from the surface of the test panel.

The test panel surface to which penetrant composition B was initially applied was then covered with a nonaqueous developer having the following composition, according to my above copending application Ser. No. 295,061:

| Components | Percent by weight |
|---|---|
| Isopropyl alcohol | 70.5 |
| Talc | 28.6 |
| Glycol monobutyl ether | 0.9 |

The above developer was permitted to remain on the half surface of the panel to which it was applied for a period of about 2 minutes, until substantially all of the isopropyl alcohol had evaporated and a substantially dry powder coating was formed.

The panel was then placed under fluorescent illumination, disclosing bright fluorescent indications of high resolution and definition from numerous readily defined microcracks therein.

Similarly the fluorescent dye penetrant B' above, containing no glycol monobutyl ether, was applied by spraying to the other half side or surface of the aluminum test panel, and excess dye penetrant was then removed in the manner described above, from the surface of the latter half of the test panel by similarly spraying with a mixture of air and water.

The above-noted nonaqueous developer composition was then applied over the latter half surface of the aluminum test panel and permitted to dry as noted above. When the latter surface was exposed to fluorescent light, fluorescent indications from the numerous microcracks in the latter half surface of the panel, of substantially the same brightness, resolution and definition were obtained as in the case of the first half surface of the panel initially coated with dye penetrant composition B as noted above, again showing that the initial addition of the glycol monobutyl ether to form the dye penetrant composition B, followed by removal thereof, does not affect the brightness, resolution and sensitivity of the basic penetrant B'.

EXAMPLE 3

The following liquid dye penetrant, designated dye penetrant C' was prepared:

| | Parts by volume |
|---|---|
| N-methyl-2-pyrrolidone | 7 |
| Isobutyl heptyl ketone | 45 |
| Tergitol Nonionic NP-14 | 30 |
| Calcofluor White RW | 6 |
| Fluorol 7 GA | 3 |

To the above dye penetrant was added glycol monobutyl ether in an amount of 50 percent by volume of the total resulting dye penetrant composition. Such dye penetrant composition containing glycol monobutyl ether was designated composition C.

The procedure of Example 1 was repeated, applying the dye penetrant composition C and dye penetrant C' to respective half sides or surfaces of a titanium test panel having microcracks within the range of those noted for the test panel in Example 1.

In the case of the half panel surface coated with dye penetrant composition C, the air-water spray preferentially removed glycol monobutyl ether, followed instantaneously by removal of the remaining dye penetrant from the surface of the panel.

Following removal of remaining dye penetrant from each of the two half surfaces of the panel, both halves of the test panel surfaces to which penetrant composition C and penetrant C' were applied, were covered with a powder developer of the type described in Example 1, following which excess developer composition was removed as described in Example 1.

Both halves of the test panel were then placed under fluorescent illumination and it was observed that both surfaces of the test panel disclosed fluorescent indications from the microcracks in the test panel, showing substantially the same concentration of numerous microcracks in both halves of the panel, with substantially corresponding brightness and definition in both half surfaces of the panel.

EXAMPLE 4

The procedure of Example 1 was repeated except that dye penetrant A' was replaced by a dye penetrant comprising 10 parts of N-methyl-2-pyrrolidone and one part of daylight visible Oil Red "O" dye, the resulting dye penetrant designated D', and to such penetrant was added glycol monobutyl ether in an amount of 35 percent by volume of the total resulting dye penetrant composition, which was designated composition D.

The compositions D and D' were applied to half surfaces of an aluminum panel containing gross cracks therein substantially greater than 0.0001 inch in width, and the respective half surfaces of the test panel were processed as in the case of compositions A and A' in Example 1, applying the developer of Example 1 to such surfaces followed by removal of excess developer as described in Example 1.

Both half surfaces of the panel were then exposed to ordinary daylight, showing the same good clarity and definition, and substantially the same brightness, of the dye trace patterns for the cracks in both half surfaces of the panel.

EXAMPLE 5

The procedure of Example 1 was substantially repeated except that the test panel contained relatively gross cracks substantially greater than 0.0001 inch in width, and no developer composition was employed.

When the test panel was placed under fluorescent illumination, both half surfaces of the panel showed substantially the same concentration of fluorescent dye traces and of substantially the same brightness and resolution, detecting the location and size of the microcracks, and again indicating substantially the same sensitivity for dye penetrant composition A following removal of the glycol monobutyl ether, as in the case of dye penetrant A' which initially contains no such glycol ether component.

EXAMPLE 6

The following liquid dye penetrant, designated dye penetrant E' was prepared:

| Components | Parts by Volume |
|---|---|
| N-methyl-2-pyrrolidone | 15 |
| Blancophor FFG (water soluble dye) | 2 |

To the above dye penetrant was added glycol monobutyl ether in an amount of 45 percent by volume of the total resulting dye penetrant composition, the latter composition being designated composition E.

The fluorescent dye penetrant composition E was applied by spraying to an aluminum test panel containing gross defects and relatively larger cracks than quenching cracks. A water wash was applied over the coating of dye penetrant composition E on the test panel, the glycol monobutyl ether being thereby removed from the dye penetrant composition, and momentarily leaving the remaining dye penetrant, free of glycol monobutyl ether, corresponding to dye penetrant E' above, such remaining dye penetrant being finally removed by said water wash.

When the panel surface was viewed under fluorescent light, good brilliant dye trace patterns of the cracks were observed.

These results were substantially the same as those obtained when applying the initial penetrant E' containing no glycol monobutyl ether, to the other half side of the same aluminum panel noted above, removing excess remaining penetrant by water wash, and viewing the test panel under fluorescent light.

From the foregoing, it is seen that the invention provides an effective water washable dye penetrant composition extended by incorporation of glycol monobutyl ether, which permits rapid initial removal of the extender, with instantaneous removal of remaining dye penetrant in a single wash operation, after application of the dye penetrant composition to a part surface, followed by further processing of the dye penetrant coating as desired in the conventional manner for viewing under suitable, e.g. fluorescent, lighting conditions, to obtain the same brilliance, definition and resolution of dye traces from cracks and flaws in the part surface, as in the case of the same dye penetrant in the absence of the glycol monobutyl ether, the use of such glycol monobutyl ether extender thus having no affect on the sensitivity properties of the penetrant, thereby avoiding the use of volatile extenders and thinners in dye penetrants.

Since various changes and modifications of the invention will occur to and can be made readily by those skilled in the art without departing from the inventive concept, the invention is not to be taken as limited except by the scope of the appended claims.

I claim:

1. A water washable liquid dye penetrant composition for use in non-destructive testing for detecting cracks and flaws in a specimen surface, which consists essentially of an N-alkyl-2-pyrrolidone, said alkyl group containing from one to four carbon atoms, a dye which is soluble in said pyrrolidone, and about 10 to about 60 percent by volume of said dye penetrant composition, of glycol monobutyl ether.

2. A water washable liquid dye penetrant composition as defined in claim 1, wherein said pyrrolidone is N-methyl-2-pyrrolidone.

3. A water washable liquid dye penetrant composition as defined in claim 1, wherein said dye is a fluorescent dye.

4. A water washable liquid dye penetrant composition as defined in claim 2, wherein said dye is a fluorescent dye.

5. A water washable liquid dye penetrant composition as defined in claim 1, said glycol monobutyl ether being employed in a proportion of about 20 to about 50 percent by volume of said composition.

6. A water washable liquid dye penetrant composition as defined in claim 4, said glycol monobutyl ether being employed in a proportion of about 20 to about 50 percent by volume of said composition.

7. A water washable liquid dye penetrant composition as defined in claim 1, the ratio of said dye to said pyrrolidone ranging from about 1 part of dye to about 25 parts of pyrrolidone, to about 2 parts of said dye to about 1 part of pyrrolidone, by volume.

8. A water washable liquid dye penetrant composition as defined in claim 6, said pyrrolidone being employed in an amount ranging from about 3 to about 85 percent by volume of said composition, the ratio of said dye to said pyrrolidone ranging from about 1 part of dye to about 25 parts of pyrrolidone, to about 2 parts of said dye to about 1 part of pyrrolidone, by volume.

9. A water washable liquid dye penetrant composition as defined in claim 1, said composition additionally including a surfactant.

10. A water washable liquid dye penetrant composition as defined in claim 8, said composition additionally including a surfactant selected from the group consisting of water soluble and water insoluble surfactants.

11. A water washable liquid dye penetrant composition as defined in claim 1, said composition additionally including a surfactant and a ketone.

12. A water washable liquid dye penetrant composition as defined in claim 8, said composition additionally including a surfactant selected from the group consisting of water soluble and water insoluble surfactants, and a ketone.

13. A water washable liquid dye penetrant composition as defined in claim 1, said composition additionally including a surfactant selected from the group consisting of water soluble and water insoluble nonyl phenyl ether of polyethylene glycol.

14. A water washable liquid dye penetrant composition as defined in claim 8, said composition additionally including a surfactant selected from the group consisting of water soluble and water insoluble nonyl phenyl ether of polyethylene glycol, and isobutyl heptyl ketone.

15. A method for detecting cracks and flaws in the surface of an object, which comprises applying to said surface a water washable liquid dye penetrant which consists essentially of an N-alkyl-2-pyrrolidone, said alkyl group containing from one to four carbon atoms, a dye which is soluble in said pyrrolidone, and about 10 to about 60 percent by volume of said dye penetrant composition, of glycol monobutyl ether, applying a water wash to the surface of said object over said dye penetrant composition thereon, and preferentially removing said glycol monobutyl ether from said dye penetrant composition, followed substantially instantaneously by removing the remaining liquid dye penetrant uniformly distributed on said surface, during said water wash application, a portion of said last mentioned liquid penetrant free of said glycol monobutyl ether remaining in said cracks and flaws in said surface, and viewing the surface of said object under lighting conditions to obtain colored traces from the dye in said cracks and flaws.

16. A method as defined in claim 15, in which, following said preferential removal of said glycol monobutyl ether, said remaining liquid dye penetrant is momentarily left on said surface, and is finally removed by said water wash.

17. A method as defined in claim 15, said water wash being carried out by application of a sprayed mixture of air and water over said surface.

18. A method as defined in claim 15, said water wash being carried out by spraying water over said surface.

19. A method as defined in claim 15, wherein said dye is a fluorescent dye and said surface of said body is viewed under fluoroscigenous light to obtain colored fluorescent traces from the dye in said cracks and flaws.

20. The method as defined in claim 15, including applying a developer to said surface after removing said remaining dye penetrant from said surface and prior to said viewing the surface of said object.

21. The method as defined in claim 15, wherein said pyrrolidone is N-methyl-2-pyrrolidone.

22. The method as defined in claim 19, wherein said pyrrolidone is N-methyl-2-pyrrolidone.

23. The method as defined in claim 22, said glycol monobutyl ether being present in said dye penetrant composition in an amount of about 20 to about 50 percent by volume of said composition.

24. The method as defined in claim 15, said dye penetrant composition additionally including a surfactant selected from the group consisting of water soluble and water insoluble surfactants.

25. The method as defined in claim 23, said pyrrolidone being employed in an amount ranging from about 3 to about 85 percent by volume of said composition, the ratio of said dye to said pyrrolidone ranging from about 1 part of dye to about 25 parts of pyrrolidone, to about 2 parts of said dye to about 1 part of pyrrolidone, by volume, and said composition additionally including a surfactant selected from the group consisting of water soluble and water insoluble surfactants.

26. A method as defined in claim 25, said dye penetrant composition additionally including a ketone.

* * * * *